US010122980B2

(12) United States Patent
Nakashima

(10) Patent No.: US 10,122,980 B2
(45) Date of Patent: Nov. 6, 2018

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Satoshi Nakashima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/051,873

(22) Filed: Feb. 24, 2016

(65) Prior Publication Data
US 2016/0261840 A1 Sep. 8, 2016

(30) Foreign Application Priority Data

Mar. 2, 2015 (JP) ................................. 2015-040687
Dec. 22, 2015 (JP) ................................. 2015-250498

(51) Int. Cl.
*H04N 9/73* (2006.01)
*H04N 13/344* (2018.01)
*G02B 27/01* (2006.01)

(52) U.S. Cl.
CPC .......... *H04N 9/735* (2013.01); *G02B 27/017* (2013.01); *H04N 13/344* (2018.05); *G02B 2027/014* (2013.01); *G02B 2027/0112* (2013.01); *G02B 2027/0138* (2013.01); *G02B 2027/0187* (2013.01); *H04N 2209/046* (2013.01)

(58) Field of Classification Search
CPC ............ H04N 9/735; H04N 2209/046; G02B 27/017; G02B 2027/0187; G02B 2027/0112; G02B 2027/0138; G02B 2027/014
USPC ........................................... 348/222.1–229.1
See application file for complete search history.

(56) References Cited

U.S. PATENT DOCUMENTS

2015/0116534 A1* 4/2015 Kim ..................... H04N 1/6027
348/223.1

FOREIGN PATENT DOCUMENTS

JP 2004-205711 A 7/2004
JP 4522307 B2 8/2010

* cited by examiner

*Primary Examiner* — Yogesh Aggarwal
(74) *Attorney, Agent, or Firm* — Carter, DeLuca, Farrell & Schmidt, LLP

(57) ABSTRACT

A color temperature of each of a first sensed image that is sensed by a first image sensing device and a second sensed image that is sensed by a second image sensing device different from the first image sensing device is acquired, a color temperature that is common between the first image sensing device and the second image sensing device is decided based on the acquired color temperatures, and color information in an image sensed by the first image sensing device and an image sensed by the second image sensing device is adjusted based on the decided color temperature.

27 Claims, 13 Drawing Sheets

| CAMERA | 21R | 20R | 20L | 21L |
|---|---|---|---|---|
| NAME | SUB-FOR-RIGHT | MAIN-FOR-RIGHT-EYE | MAIN-FOR-LEFT-EYE | SUB-FOR-LEFT |
| PURPOSE | DETECT POSITION AND ORIENTATION | CAPTURE FIELD-OF-VIEW REGION | CAPTURE FIELD-OF-VIEW REGION | DETECT POSITION AND ORIENTATION |
| IMAGE SENSOR | Y TYPE | X TYPE | X TYPE | Y TYPE |

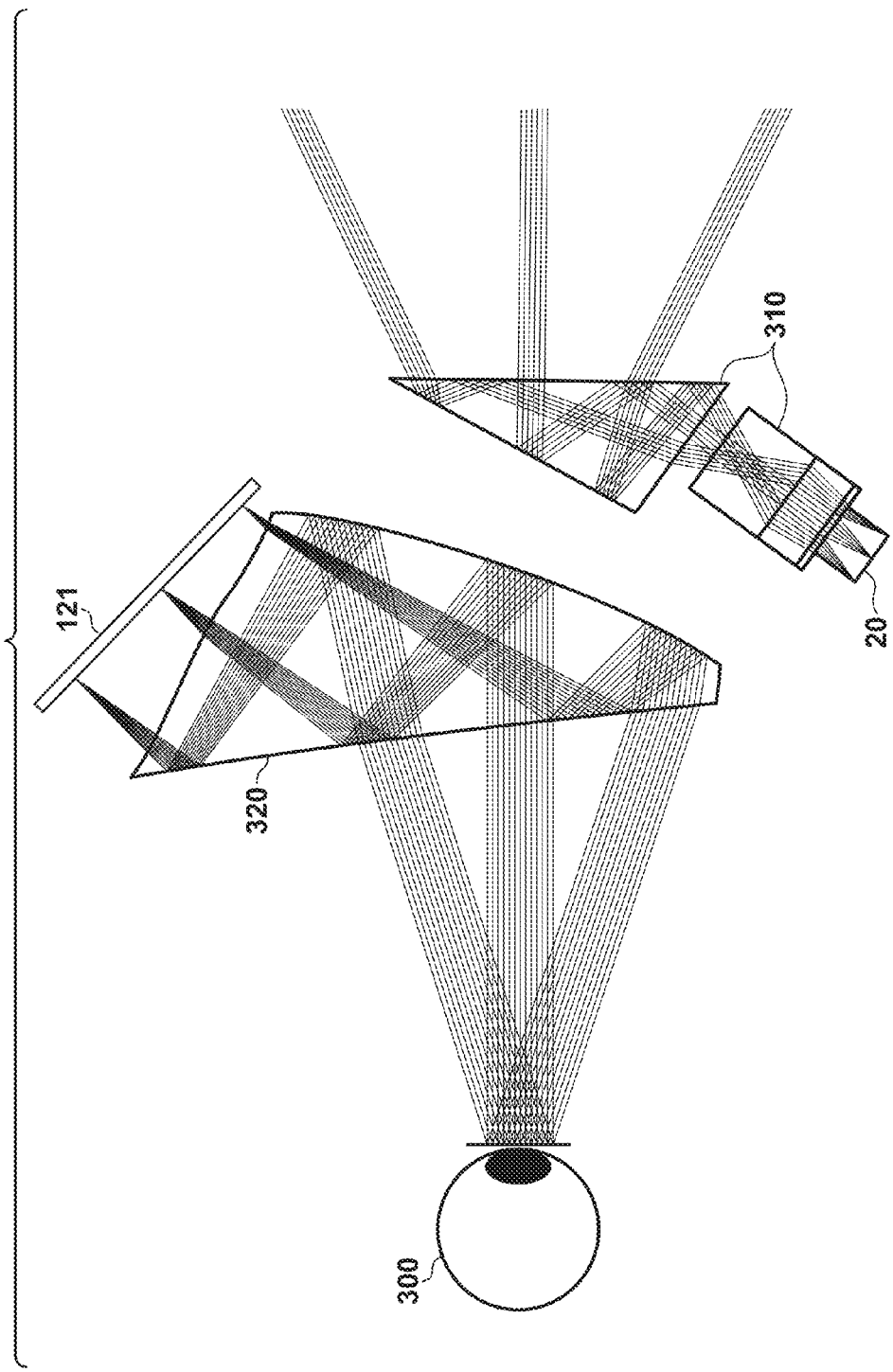

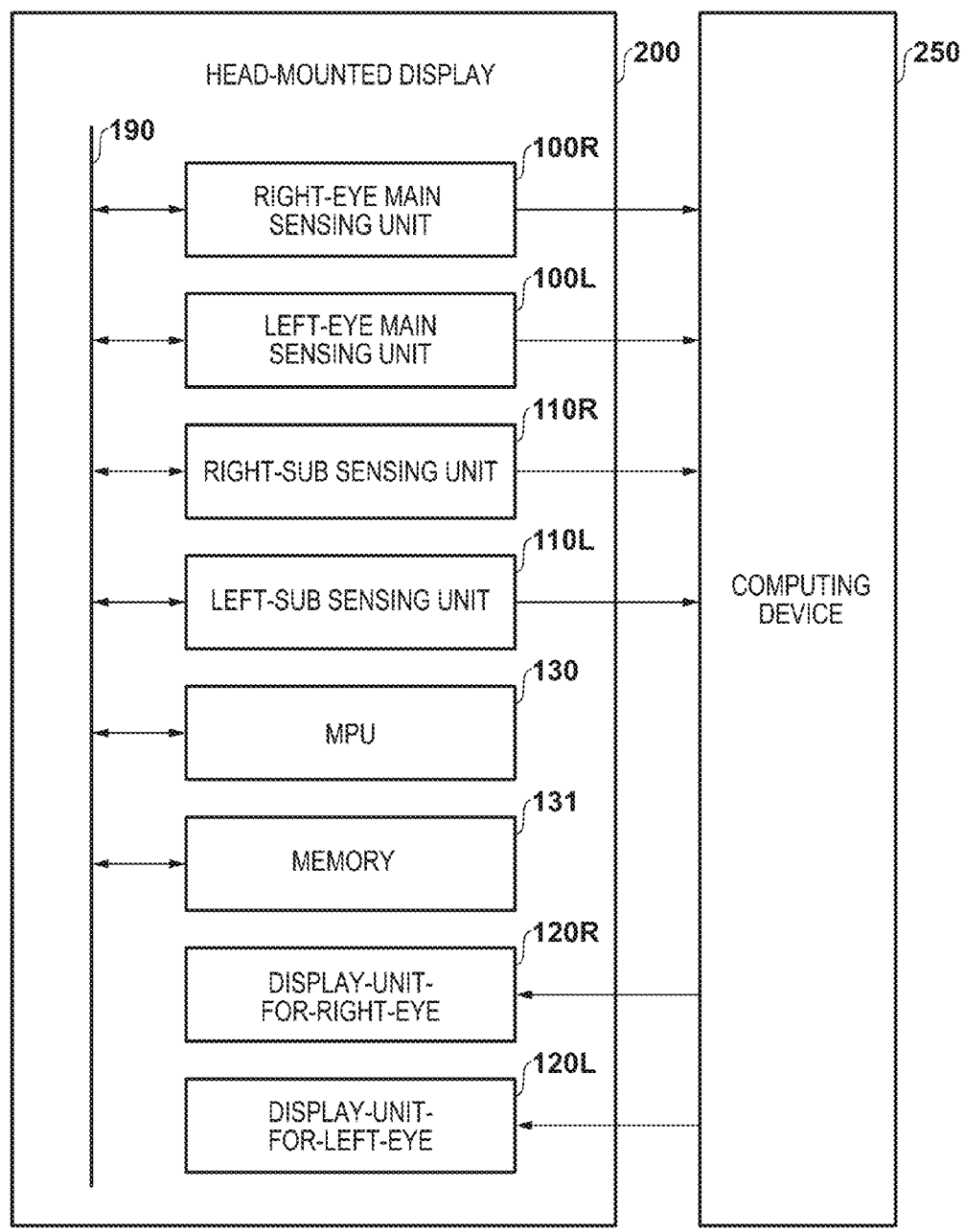

| CAMERA | 22R | 22L |
|---|---|---|
| NAME | MAIN-FOR-RIGHT-EYE | MAIN-FOR-LEFT-EYE |
| PURPOSE | DETECT POSITION AND ORIENTATION AND CAPTURE FIELD-OF-VIEW REGION | |
| IMAGE SENSOR | X TYPE | Y TYPE |

| CAMERA | 23R | 23L |
|---|---|---|
| NAME | MAIN-FOR-RIGHT-EYE | MAIN-FOR-LEFT-EYE |
| PURPOSE | DETECT POSITION AND ORIENTATION AND CAPTURE FIELD-OF-VIEW REGION | |
| IMAGE SENSOR | Y TYPE | Y TYPE |

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique for adjusting a color balance between a plurality of cameras.

Description of the Related Art

In recent years a so-called MR (Mixed Reality) technique is known as a technique for causing the real world and a virtual world to be seamlessly blended in real-time. One known MR technique is a technique in which a video see-through HMD (Head-Mounted Display) is used, an object that approximately matches an object observed from a pupil position of a HMD apparatus user is sensed by a video camera or the like, and the HMD apparatus user can observe an image in which CG (Computer Graphics) is superimposed on the sensed image.

Japanese Patent Laid-Open No. 2004-205711 discloses, as an MR system that uses a video see-through type HMD, a technique that uses an HMD provided with a first camera that senses a field-of-view region of a HMD user, and a second camera that senses an image in order to detect a position and orientation of the HMD.

Japanese Patent No. 4522307 discloses, as an MR system that uses a video see-through type HMD, a technique for causing brightness or color in left and right sensed images from sensed luminance information to match among a plurality of cameras for a right eye and for a left eye.

However, the techniques disclosed in the above-described patent literature have a problem as below.

Japanese Patent No. 4522307 discloses using a common luminance value, obtained in accordance with processing for averaging luminance from a plurality of differing pieces of luminance information sensed by a plurality of cameras, to perform WB (white balancing) correction control in a unified manner. However, in the technique disclosed in Japanese Patent No. 4522307, if a characteristic, a setting, or the like among the plurality of cameras exceeds an allowable range, it is not possible to perform unified WB correction control in which color matches among the plurality of cameras.

Japanese Patent Laid-Open No. 2004-205711 is also similar; in a configuration in which cameras (image sensors) of differing types are equipped as is disclosed by Japanese Patent Laid-Open No. 2004-205711, there is a problem in that, for reasons such as the image sensors being different or luminance adjustment processing being performed in accordance with a purpose where the purpose differs, it is not possible to hold a common luminance value between a plurality of cameras, and unified WB correction control is not possible.

SUMMARY OF THE INVENTION

The present invention was conceived in view of these kinds of problems, and provides a technique for performing unified color balance adjustment in which color matches among a plurality of cameras.

According to the first aspect of the present invention, there is provided an image processing apparatus comprising: an acquisition unit configured to acquire a color temperature of each of a first sensed image that is sensed by a first image sensing device and a second sensed image that is sensed by a second image sensing device different from the first image sensing device; a decision unit configured to decide a color temperature that is common between the first image sensing device and the second image sensing device based on the color temperatures acquired by the acquisition unit; and an adjustment unit configured to adjust color information in an image sensed by the first image sensing device and an image sensed by the second image sensing device based on the color temperature decided by the decision unit.

According to the second aspect of the present invention, there is provided an image processing method comprising: acquiring a color temperature of each of a first sensed image that is sensed by a first image sensing device and a second sensed image that is sensed by a second image sensing device different from the first image sensing device; deciding a color temperature that is common between the first image sensing device and the second image sensing device based on the acquired color temperatures; and adjusting color information in an image sensed by the first image sensing device and an image sensed by the second image sensing device based on the decided color temperature.

According to the third aspect of the present invention, there is provided a non-transitory computer-readable storage medium storing a computer program for causing a computer to function as an acquisition unit configured to acquire a color temperature of each of a first sensed image that is sensed by a first image sensing device and a second sensed image that is sensed by a second image sensing device different from the first image sensing device; a decision unit configured to decide a color temperature that is common between the first image sensing device and the second image sensing device based on the color temperatures acquired by the acquisition unit; and an adjustment unit configured to adjust color information in an image sensed by the first image sensing device and an image sensed by the second image sensing device based on the color temperature decided by the decision unit.

Further features of the present invention will become apparent from the following description of exemplary embodiments (with reference to the attached drawings).

BRIEF DESCRIPTION OF THE DRAWINGS

FIG. 3 is a view illustrating a principal configuration example in the head-mounted display 200.

FIGS. 4A-4C are views for explaining the configuration of the head-mounted display 200.

DESCRIPTION OF THE EMBODIMENTS

Embodiments of the present invention will be described hereinafter in detail, with reference to the accompanying drawings. Note that embodiments described below merely illustrate examples of specifically implementing the present invention, and are only specific embodiments of a configuration defined in the scope of the claims.

First Embodiment

Below, explanation is given of an example of an image processing apparatus that acquires a color temperature of each of a first sensed image that is sensed by a first image sensing device and a second sensed image that is sensed by a second image sensing device different from the first image sensing device, decides a color temperature that is common between the first image sensing device and the second image sensing device based on the acquired color temperatures, and adjusts color information in an image sensed by the first image sensing device and an image sensed by the second image sensing device based on the decided color temperature. In this example, although explanation is given of a case in which the image processing apparatus is a head-mounted display such as an HMD, the image processing apparatus that has a configuration such as this is not limited to being applied to a head-mounted display, and, for example, may be applied to a 3D display apparatus that displays, on one screen, images for a right eye and for a left eye in a striped form.

Figure 2:
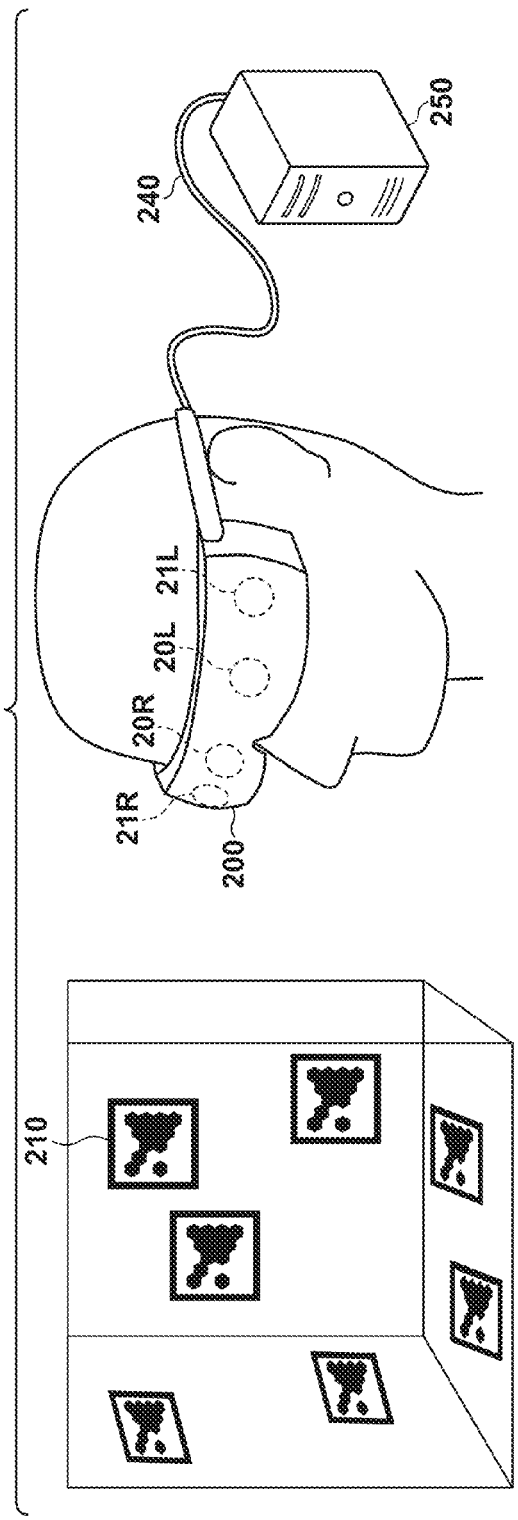
FIG. 2 is a view for illustrating an example configuration of an MR system.

Firstly, FIG. 2 is used to explain an example configuration of an MR system that includes a head-mounted display according to the present embodiment. As illustrated in FIG. 2, the MR system has a head-mounted display 200 that provides an image of a mixed reality space, which is a space that blends a virtual space and a physical space in front of a user's eyes; a computing device 250 that generates the image of the mixed reality space and provides it to the head-mounted display 200; and a cable 240 that connects the head-mounted display 200 and the computing device 250. Note that although the cable 240 is illustrated as a wired communication path, a wireless communication path may be used instead.

Next, the configuration of the head-mounted display 200 will be explained in further detail. The head-mounted display 200 is a so-called video see-through type head-mounted display, and has sub-cameras (a sub-camera-for-right-eye 21R and a sub-camera-for-left-eye 21L) that sense images that are used to obtain a position and orientation of the head-mounted display 200, and main cameras (a main-camera-for-right-eye 20R and a main-camera-for-left-eye 20L) that sense images of a physical space that are composed with images of the virtual space when generating an image of the mixed reality space.

The sub-cameras are cameras for sensing markers 210 disposed in a physical space, and the computing device 250 can calculate a position and orientation of the head-mounted display 200 by executing conventional processing that uses an image of a marker 210 sensed by a sub-camera. Strictly speaking, in addition to using the image sensed by the sub-camera-for-left-eye 21L to calculate the position and orientation of the main-camera-for-left-eye 20L, the image sensed by the sub-camera-for-right-eye 21R is used to calculate the position and orientation of the main-camera-for-right-eye 20R. The computing device 250 generates an image of the mixed reality space by generating, based on position and orientation of the main cameras, an image of the virtual space from the perspective of the position and orientation of the main cameras, and composing the generated image of the virtual space with a sensed image of the physical space by the main camera. Strictly speaking, by generating, based on a position and orientation of the main-camera-for-left-eye 20L, an image of the virtual space from the perspective of the position and orientation of the main-camera-for-left-eye 20L, and composing the generated image of the virtual space with the sensed image of the physical space by the main-camera-for-left-eye 20L, an image of a mixed reality space that is provided to a left eye of a user is generated. Also, by generating, based on a position and orientation of the main-camera-for-right-eye 20R, an image of the virtual space from the perspective of the position and orientation of the main-camera-for-right-eye 20R, and composing the generated image of the virtual space with the sensed image of the physical space by the main-camera-for-right-eye 20R, an image of a mixed reality space that is provided to a right eye of a user is generated. The computing device 250 then sends the generated images of the mixed reality space (the image of the mixed reality space for the right eye and the image of the mixed reality space for the left eye) to the head-mounted display 200.

In this way, a purpose of the main cameras and the sub-cameras differs. As illustrated in FIG. 2, because the main camera has as an objective sensing an image of the physical space to provide to the user (sensing a user's field-of-view region), an image sensor that is used is an image sensor of a type (hypothetically defined as an X type) having features such as having a broad field of view in a leftward/rightward orientation, low noise, and a wide color gamut. In the present embodiment, a type of a rolling shutter method is used as the X type. In contrast, because the sub-cameras have an objective of sensing images used to obtain a position and orientation, they use image sensors of a type (hypothetically defined as a Y type) of a global shutter method, for which a field of view in an upward/downward orientation where markers are present is wide, and moving object distortion of the markers, called image flow, is not generated.

Note that, the number of sub-cameras may be 2 or more to expand an image sensing range and increase a possibility of sensing a marker; also, the number of sub-cameras may be 1 to lower costs though detection precision will become lower, or conversely if it is a high-capability camera having a broad field of view in a leftward/rightward orientation as well.

A principal example configuration of the head-mounted display 200 is illustrated in FIG. 3. Because there is a pair of configurations—for the right eye and for the left eye—only one is shown graphically in FIG. 3. The head-mounted display 200 has a display element 121, which is comprised by small-scale liquid crystal displays for the right eye and for the left eye; a display optical system 320 such as a free curvature prism for performing a magnified display of the images for the right eye and the left eye that are displayed on the display element 121; a main camera 20 for sensing an object that approximately matches an object observed from a position of a pupil 300 of a head-mounted display 200 wearer; and an imaging optical system 310 for causing the position of the pupil 300 to approximately match the position of the main camera 20. The sub-camera (not shown) is arranged on the outside of the main camera 20 with respect to a face center of the head-mounted display 200 wearer.

Next, the block diagram of FIG. 4A is used to explain the hardware configuration example of the head-mounted display 200.

A right-eye main sensing unit 100R is a capturing unit that includes a main-camera-for-right-eye 20R, an optical system of the main-camera-for-right-eye 20R, and various processing circuits for the main-camera-for-right-eye 20R.

A left-eye main sensing unit 100L is a capturing unit that includes the main-camera-for-left-eye 20L, an optical system of the main-camera-for-left-eye 20L, and various processing circuits for the main-camera-for-left-eye 20L.

A right sub sensing unit 110R is a capturing unit that includes the sub-camera-for-right-eye 21R, an optical system of the sub-camera-for-right-eye 21R, and various processing circuits for the sub-camera-for-right-eye 21R.

A left sub sensing unit 110L is a capturing unit that includes the sub-camera-for-left-eye 21L, an optical system of the sub-camera-for-left-eye 21L, and various processing circuits for the sub-camera-for-left-eye 21L.

A display-unit-for-right-eye 120R is attached onto the head-mounted display 200 so as to be positioned in front of a right eye of a user wearing the head-mounted display 200, and displays an image, generated by the computing device 250, of the mixed reality space for the right eye.

A display-unit-for-left-eye 120L is attached onto the head-mounted display 200 so as to be positioned in front of a left eye of a user wearing the head-mounted display 200, and displays an image, generated by the side of the computing device 250, of the mixed reality space for the left eye.

By executing processing that uses data or a computer program stored in a memory 131 of the head-mounted display 200, a MPU 130 performs operation control of each above-described functional unit that is connected to a bus 190, and also performs operation control of the head-mounted display 200 as a whole.

The memory 131 includes various memories, such as a memory for storing information, which is explained as known information in the following explanation, and data or a computer program for causing the MPU 130 to execute each process that is later explained as something that the MPU 130 performs; a memory that has a work area used when the MPU 130 executes various processing; or the like.

Figure 4B:
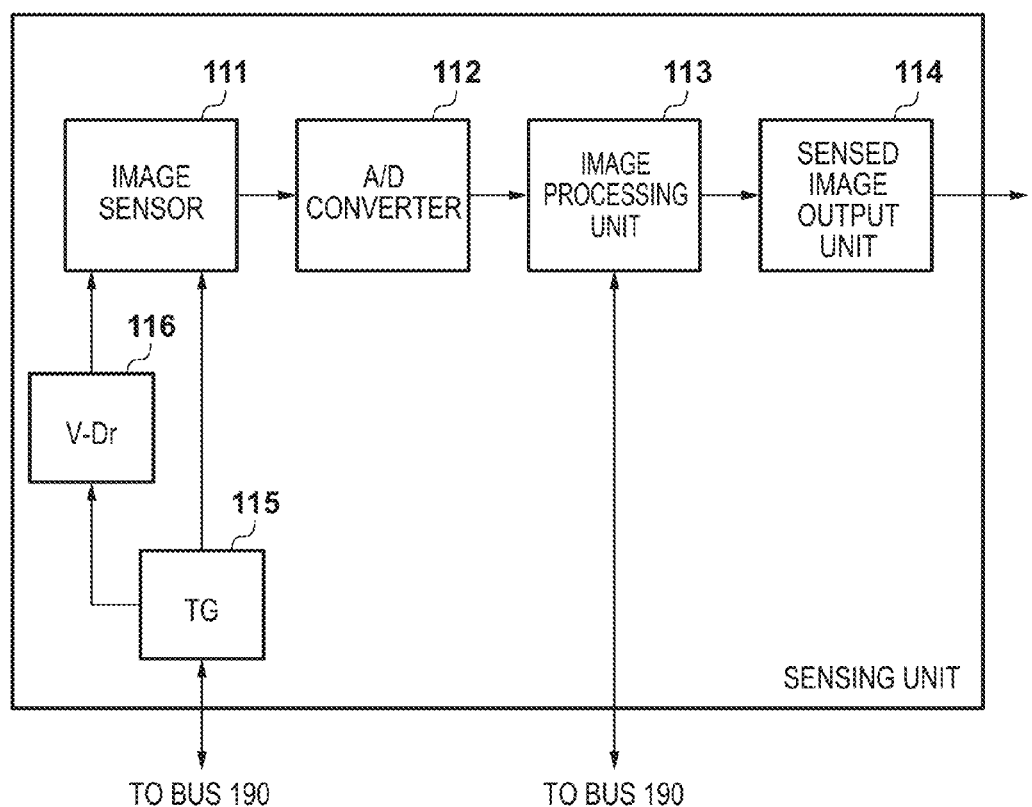

An example configuration of a capturing unit that can be applied to each of the right-eye main sensing unit 100R, the left-eye main sensing unit 100L, the right sub sensing unit 110R, and the left sub sensing unit 110L is illustrated in FIG. 4B.

An image sensor 111 is a CCD image sensor or the like, converts light in the external world into an analog electrical signal and outputs it, and is driven in accordance with signals from a TG (a timing generator) 115 and a V-Dr (V driver) 116 that generates a signal of a vertical direction after receiving a signal from the TG 115.

An A/D converter 112 converts an analog electrical signal output from the image sensor 111 to a digital electrical signal.

By applying various image processing to the digital electrical signal converted by the A/D converter 112, the image processing unit 113 generates and outputs a sensed image that has been image processed. This image processing includes processing for adjusting a color balance that is described later.

A sensed image output unit 114 outputs the sensed image, to which the image processing by the image processing unit 113 has been applied, to the computing device 250 in an appropriate image format. Note that an output destination of the sensed image output unit 114 is not limited to the computing device 250.

Figure 4C:
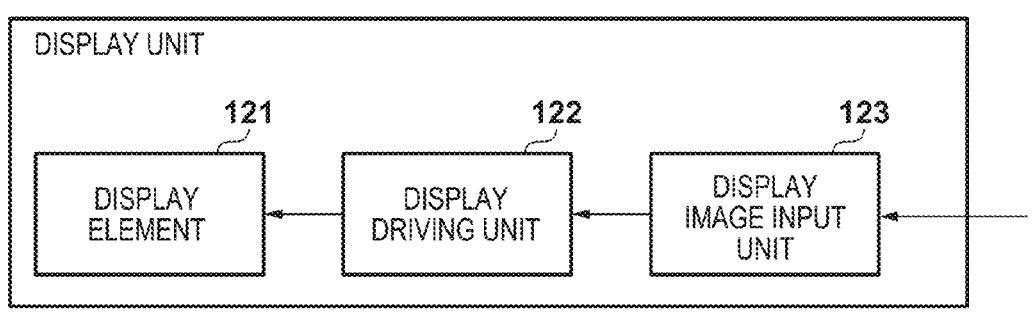

An example configuration of a display unit that can be applied to each of the display-unit-for-right-eye 120R and the display-unit-for-left-eye 120L is illustrated in FIG. 4C.

A display image input unit 123 receives an image of a mixed reality space that is output from the computing device 250, and transfers the received image of the mixed reality space to a display driving unit 122.

The display driving unit 122 drives the display element 121 to cause the image of the mixed reality space transferred from the display image input unit 123 to be displayed.

The display element 121 is a display element, such as p-Si TFT or LCOS, is driven by the display driving unit 122, and displays the image of the mixed reality space that the display image input unit 123 receives from the computing device 250.

Figure 6:
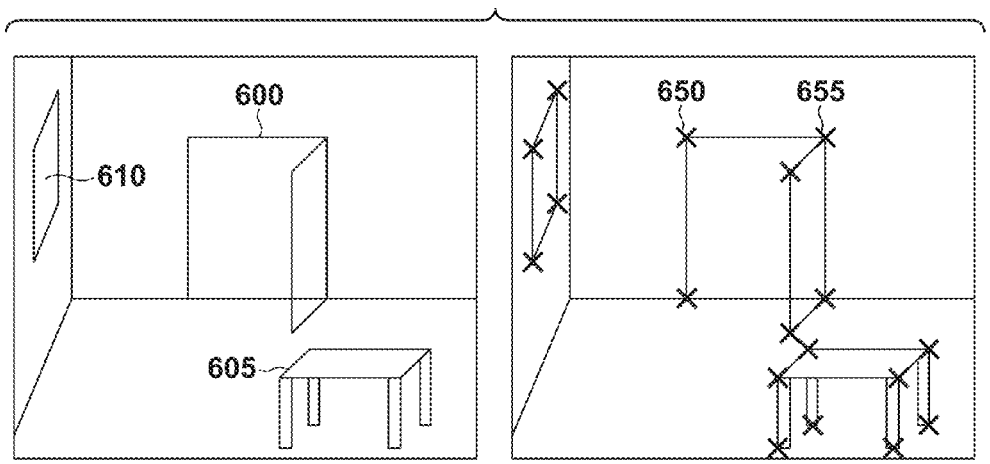
FIG. 6 is a view for illustrating natural features in an image, and feature points thereof.

Note that, as described above, the computing device 250 uses the image sensed by the sub-camera to calculate the position and orientation of the main camera, but, in more detail, the computing device 250 detects a marker from the sensed image in accordance with image analysis, and acquires information such as a size, a shape, a fill pattern, or the like of the detected marker. From this information acquired by the marker detection, the computing device 250 calculates three-dimensional position and orientation information regarding a relative positional relationship between the marker and the head-mounted display 200, and a direction in which a user who is wearing the head-mounted display 200 observes the marker. In this way, by using a plurality of markers and defining beforehand a positional relationship of each marker as indicator arrangement information, it becomes possible to calculate a direction in which a marker is observed from these relative positional relationships. Accordingly, rather than a marker by which discrimination of even a direction is possible by an internal fill pattern, it is possible to use a marker that holds unidimensional information and does not hold directional information such as a light-emitting element (e.g. an LED), a color marker or the like, for example. In addition, instead of the markers 210 as illustrated in FIG. 2, it is possible to extract natural features in an image, such as for example outlines of a door 600, a table 605, and a window 610 as in FIG. 6, specific colors in the image, or the like, and use these to calculate three-dimensional position and orientation information. The reference numerals 650 and 655 illustrate a portion of feature points of the door 600 by "x" marks. By using a plurality of markers of the same type, using several types of markers simultaneously, or by combining and using information of feature points in the image and marker information, it is possible to generate three-dimensional position and orientation information of a higher precision.

By the above configuration, a viewer, by wearing the head-mounted display 200 on his or her head, can experience a mixed reality space that seamlessly blends the physical space and the virtual space in real-time.

Figure 5:
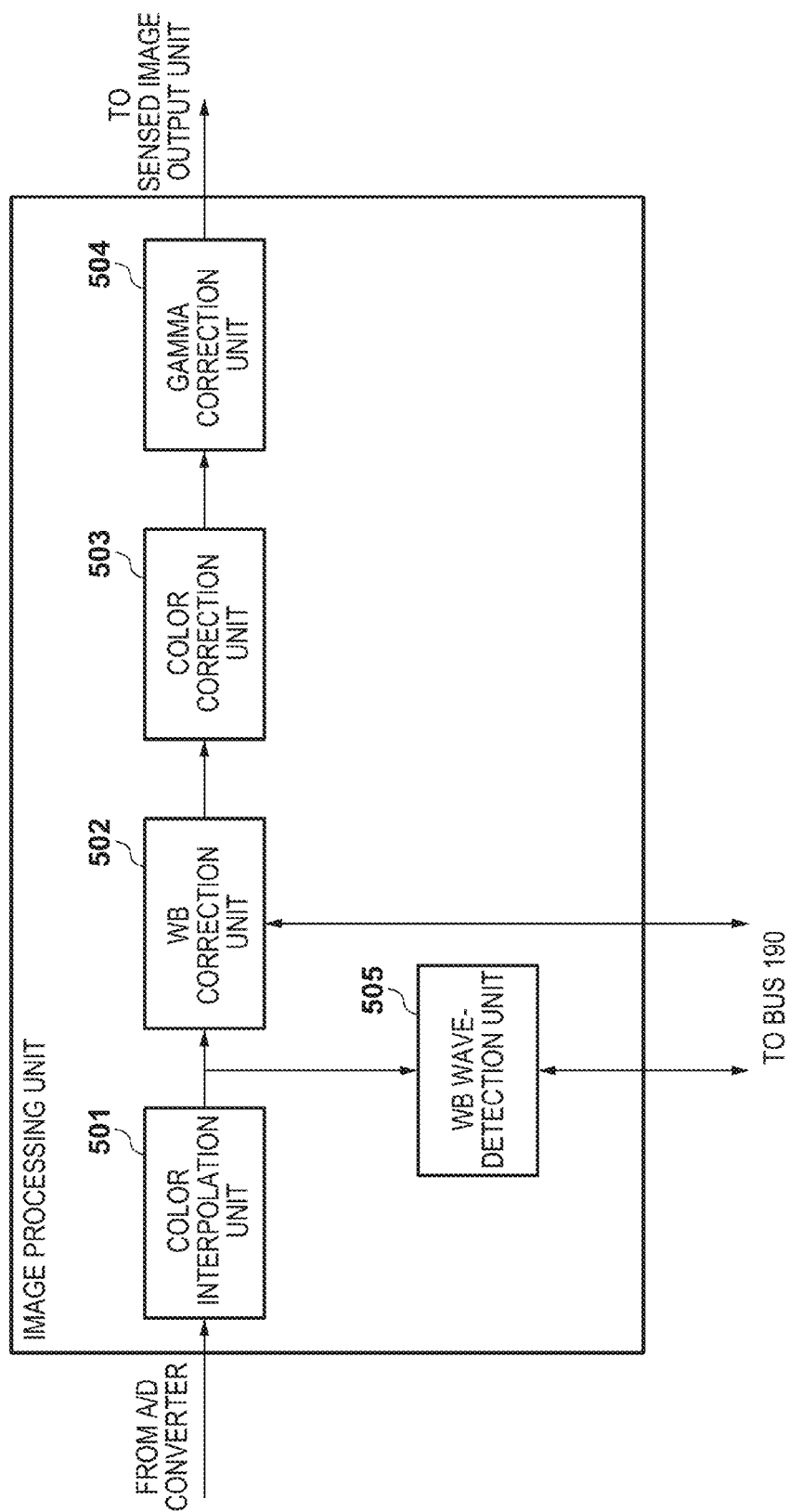
FIG. 5 is a block diagram for illustrating a more detailed example configuration of an image processing unit 113.

Next, a block diagram of FIG. 5 is used to explain an example configuration of the image processing unit 113 in further detail.

By interpolation from adjacent pixels (adjacent pixels are pixels whose colors are different to each other) in an image (an image of, for example, a Bayer pattern in which each pixel is one of R, G, or B) expressed by a digital electrical signal output from the A/D converter 112, a color interpolation unit 501 obtains (restores) pixel values of each of R, G, and B in each pixel that configures the sensed image.

A WB wave-detection unit 505 sets the entire sensed image, which is generated by the color interpolation unit 501, or a partial region thereof (for example, a partial region of a prescribed size that is centered on a center position of the sensed image) as a target region, and obtains average pixel values (an R average pixel value, a G average pixel value, and a B average pixel value) in the target region. The R average pixel value in the target region is a result of obtaining a total value of R component pixel values of all pixels included in the target region, and dividing the total value by the number of pixels included in the target region. This is similar when obtaining the G average pixel value and the B average pixel value. The WB wave-detection unit 505 then sends the respective R, G, and B average pixel values obtained for the target region to the MPU 130.

A WB correction unit 502 receives a R WB correction value, a G WB correction value, and a B WB correction value that the MPU 130 decided based on the R average pixel value and the B average pixel value, and by performing processing such as gain correction in accordance with these WB correction values with respect to the sensed image generated by the color interpolation unit 501, the WB correction unit 502 adjusts an achromatic color balance, and with this realizes WB correction with respect to the sensed image.

A color correction unit 503 corrects a color of a sensed image for which the color balance has been adjusted by the WB correction unit 502, and a gamma correction unit 504 corrects a tone of a brightness of a sensed image for which the color has been corrected by the color correction unit 503.

Figure 1:
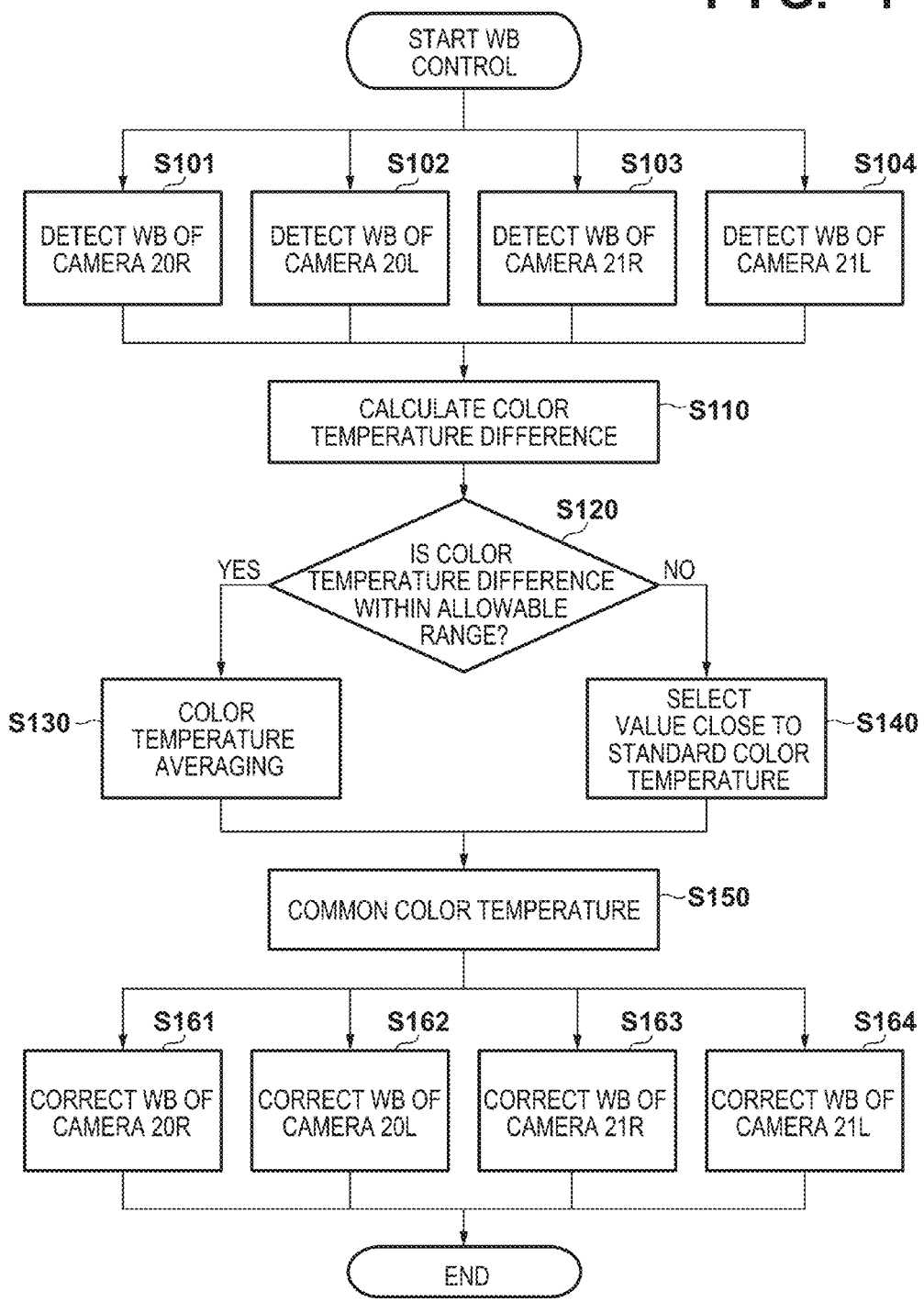
FIG. 1 is a flowchart of processing that a head-mounted display 200 performs.

Next, regarding processing that the head-mounted display 200 (mainly the image processing unit 113 and the MPU 130) performs, explanation is given using FIG. 1, which illustrates a flowchart of the same processing.

<Step S101>

Figure 7A:
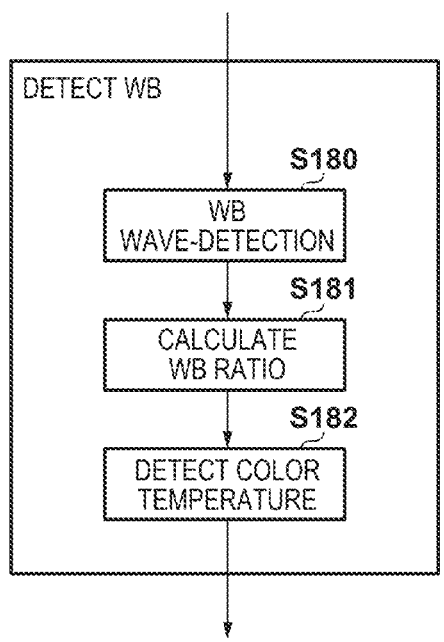
FIGS. 7A and 7B are flowcharts of processing of step S101 to step S104, and step S161 to step S164.

By the right-eye main sensing unit 100R and the MPU 130 performing processing in accordance with the flowchart of FIG. 7A, a color temperature in the entire image sensed by the right-eye main sensing unit 100R or a partial region thereof is acquired.

<Step S102>

By the left-eye main sensing unit 100L and the MPU 130 performing processing in accordance with the flowchart of FIG. 7A, a color temperature in the entire image sensed by the left-eye main sensing unit 100L or a partial region thereof is acquired.

<Step S103>

By the right sub sensing unit 110R and the MPU 130 performing processing in accordance with the flowchart of FIG. 7A, a color temperature in the entire image sensed by the right sub sensing unit 110R or a partial region thereof is acquired.

<Step S104>

By the left sub sensing unit 110L and the MPU 130 performing processing in accordance with the flowchart of FIG. 7A, a color temperature in the entire image sensed by the left sub sensing unit 110L or a partial region thereof is acquired.

Below, explanation is given for a case in which processing in accordance with the flowchart of FIG. 7A is executed in step S101. In such a case, processing in accordance with the flowchart of FIG. 7A is executed by the MPU 130 and functional units in the right-eye main sensing unit 100R. Note that if executing processing in accordance with the flowchart of FIG. 7A in step S102, processing in accordance with the flowchart of FIG. 7A is executed by the MPU 130 and functional unit in the left-eye main sensing unit 100L. Also if executing processing in accordance with the flowchart of FIG. 7A in step S103, processing in accordance with the flowchart of FIG. 7A is executed by the MPU 130 and functional unit in the right sub sensing unit 110R. Also if executing processing in accordance with the flowchart of FIG. 7A in step S104, processing in accordance with the flowchart of FIG. 7A is executed by the MPU 130 and functional unit in the left sub sensing unit 110L.

<Step S180>

The WB wave-detection unit 505 sets the entire sensed image generated by the color interpolation unit 501 or a partial region thereof as a target region, and obtains average pixel values (the R average pixel value, the G average pixel value, and the B average pixel value) of the target region. The WB wave-detection unit 505 then sends the respective R, G, and B average pixel values obtained for the target region to the MPU 130.

<Step S181>

The MPU 130 uses the B average pixel value and the R average pixel value received from the WB wave-detection unit 505 to obtain (the B average pixel value/the R average pixel value) as a WB ratio.

<Step S182>

Figure 8:
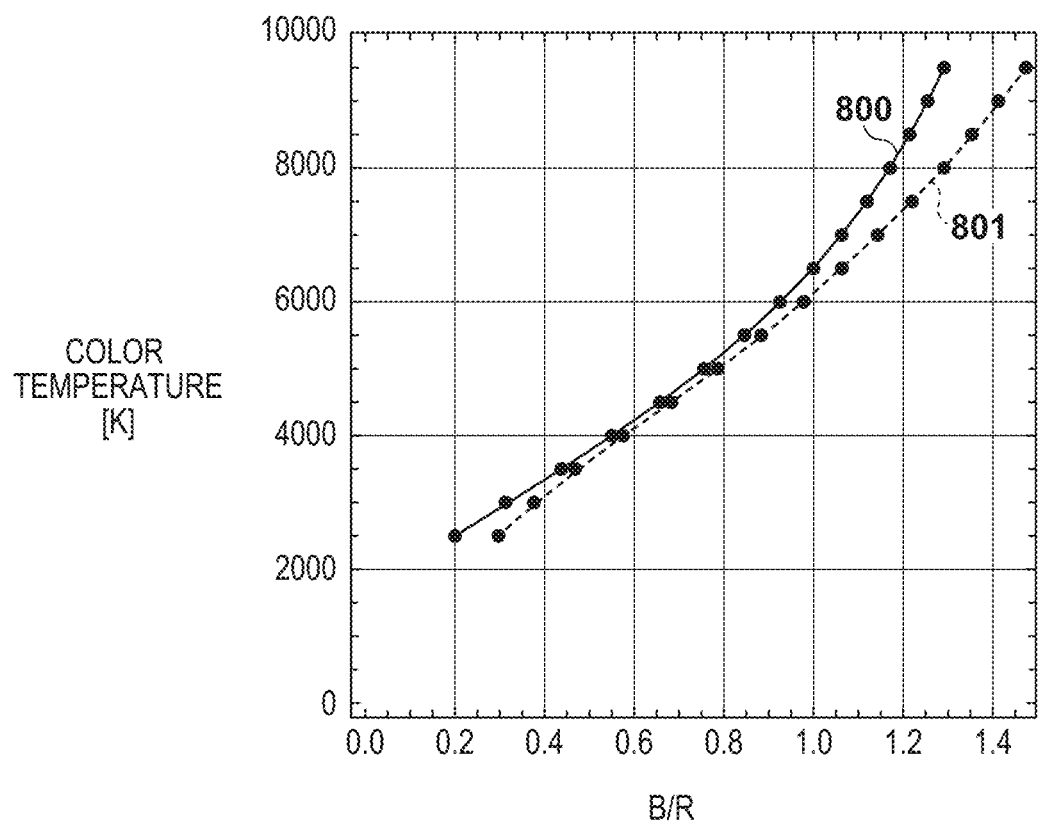
FIG. 8 is a view for illustrating an example configuration of a color temperature detection table.

The MPU 130 uses a color temperature detection table generated for each capturing unit in advance to acquire a color temperature that corresponds to the WB ratio obtained in step S181. An example configuration of the color temperature detection table is illustrated in FIG. 8. The abscissa axis in FIG. 8 indicates the WB ratio and the ordinate axis indicates the color temperature. Reference numeral 800 represents a color temperature detection table that expresses a correspondence relationship between the WB ratio and the color temperature corresponding to the image sensor (X type) used by the main cameras, and reference numeral 801 represents a color temperature detection table that expresses the correspondence relationship between the WB ratio and the color temperature corresponding to an image sensor (Y type) used by the sub-cameras. For the color temperature conversion tables, because a characteristic differences according to each type of image sensor is large compared to left and right individual differences of image sensors of the same type, it is assumed that the left and right individual differences can been ignored, and that color temperature detection table are only registered according to type. In other words, in step S101 and step S102, the common color temperature detection table 800 is used to acquire respective color temperatures, and in step S103 and step S104, the common color temperature detection table 801 is used to acquire respective color temperatures.

In this way, by executing processing in accordance with the flowchart of FIG. 7A in step S101 to in step S104, a color temperature T1 in the image sensed by the right-eye main sensing unit 100R or a partial region thereof, a color temperature T2 in the image sensed by the left-eye main sensing unit 100L or a partial region thereof, a color temperature T3 in the image sensed by the right sub sensing unit 110R or a partial region thereof, and a color temperature T4 in the image sensed by the left sub sensing unit 110L or a partial region thereof can be acquired.

<Step S110>

The MPU 130 obtains a maximum difference (color temperature difference) ΔT, among T1, T2, T3, and T4. This is firstly obtaining Tmax=MAX (T1, T2, T3, T4), and Tmin=MIN (T1, T2, T3, T4). Here, MAX(x1, x2, . . . , xn) is a function that returns a maximum value from x1 to xn, and MIN(x1, x2, . . . , xn) is a function that returns a minimum value from x1 to xn. ΔT=Tmax−Tmin is then calculated.

For example, if T1=3500K, T2=3550K, T3=3650K, and T4=3900K (a unit K of color temperature is Kelvin), the color temperature Tmax=MAX(T1, T2, T3, T4)=3900K, and the color temperature Tmin=MIN(T1, T2, T3, T4)=3500K, so the color temperature difference ΔT=400K.

Additionally, explanation is given for a reason as to why the color temperatures acquired from the sensed image by each capturing unit vary in this way. Firstly, a difference in actual color temperature among the capturing units may occur due to rays of ambient light input being different due to differing attachment positions of the capturing units (20R, 20L, 21R, 21L) as illustrated in FIG. 2. In particular, the sub-cameras are arranged on the left and right outside of the main cameras, and moreover have a field of view that is wider in the upward/downward orientation; an image center orientation is also shifted in the upward/downward orientation, or the like, and ambient light is focused differently to the main camera. This is because there are cases in which light entering a capturing unit differs depending on the orientation or location in which various ambient light, such as light in accordance with a ceiling light, indirect light where light of the ceiling light has reflected from a wall, sunlight entering from a window, or the like, mixes. In addition, as another reason why color temperature varies, there are also individual differences of sensors in a capturing unit.

<Step S120>

The MPU 130 determines whether the color temperature difference ΔT obtained in step S110 is within the allowable range ΔTerror (in an allowable range). For example, it is determined whether the absolute value of the color temperature difference ΔT is less than or equal to the allowable range ΔTerror.

The allowable range ΔTerror is for example a value such as 500K. The value of the allowable range ΔTerror is set in advance from a detection error that occurs due to individual differences of image sensors in a capturing unit, a condition of entrance of rays of ambient light according to an attachment position of a capturing unit, or the like. Note that a value of the allowable range ΔTerror is not limited to a fixed value, and may be a fluctuating value for which an average color temperature of all capturing units or an error allowed in accordance with a color temperature of a specific capturing unit differs.

As a result of this determination, if the color temperature difference ΔT is within the allowable range ΔTerror, the processing proceeds to step S130, and if the color temperature difference ΔT is not within the allowable range ΔTerror, the processing proceeds to step S140.

<Step S130>

The MPU 130 decides the average color temperature Tave of T1, T2, T3, and T4 as the common color temperature of the right-eye main sensing unit 100R, the left-eye main sensing unit 100L, the right sub sensing unit 110R, and the left sub sensing unit 110L. The average color temperature Tave can be calculated in accordance with the following formula.

$$Tave=AVE(T1,T2,T3,T4)$$

Here AVE(x1, x2, . . . , xn) is a function that returns an average value of x1 through to xn. For example, if T1=3500K, T2=3550K, T3=3650K, and T4=3900K, then the average color temperature Tave=3650K.

<Step S140>

As the color temperature difference ΔT exceeds the allowable range ΔTerror and it is difficult to handle the color temperature of all capturing units the same, the MPU 130 selects, in accordance with a prescribed standard, one of T1, T2, T3, and T4 as the common color temperature among the right-eye main sensing unit 100R, the left-eye main sensing unit 100L, the right sub sensing unit 110R, and the left sub sensing unit 110L. In the present embodiment, a standard color temperature is determined in advance, and the color temperature closest to the standard color temperature from T1, T2, T3, and T4 is selected as the common color temperature among the right-eye main sensing unit 100R, the left-eye main sensing unit 100L, the right sub sensing unit 110R, and the left sub sensing unit 110L. For example, if a standard light source as D55 and a standard color temperature of 5500K is assumed, and T1=3500K, T2=3550K, T3=3650K, and T4=3900K, then because the color temperature closest to the standard color temperature from T1, T2, T3, and T4 is T4 (3900K), then T4 is selected as the common color temperature among the right-eye main sensing unit 100R, the left-eye main sensing unit 100L, the right sub sensing unit 110R, and the left sub sensing unit 110L.

Here, explanation is given for a reason why the color temperature closest to the standard color temperature is selected. Firstly, a reason why a standard ambient light is arranged is that since a design in which maintaining WB precision maximally is difficult for any color temperature among a plurality of color temperatures, a color temperature that should be often used in ambient light when using the head-mounted display 200 is set so as to achieve a design in which WB precision becomes highest by that color temperature. Because a color balance for when WB correction is performed at a time of a standard color temperature 5500K is a standard for a design, it means that regardless of what the color temperature environment is, all approach a WB condition at a time of the standard color temperature 5500K after WB correction.

Figure 9:
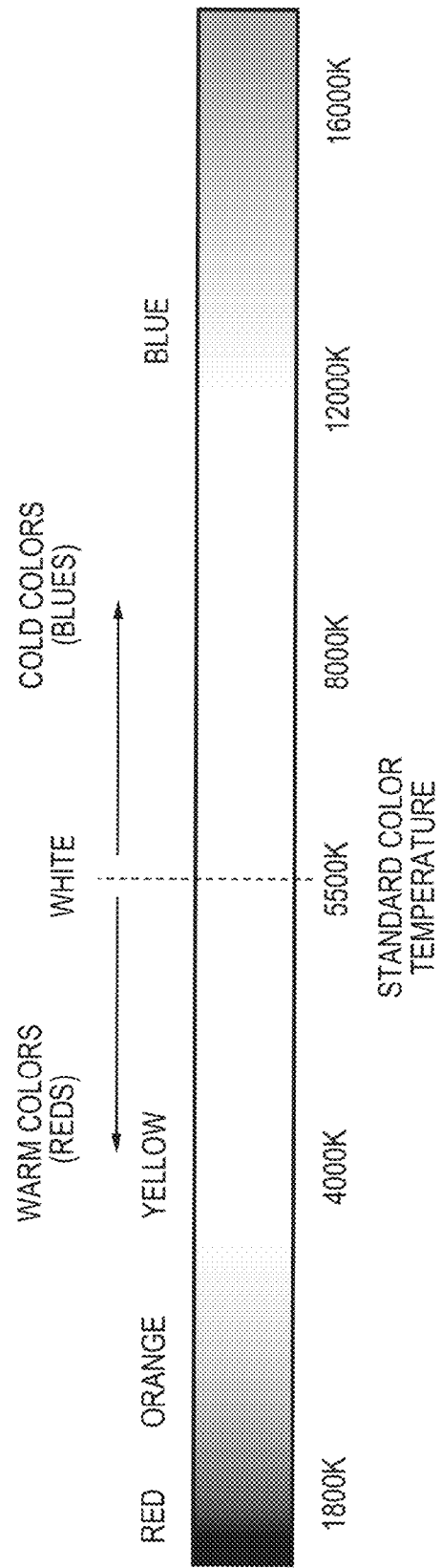
FIG. 9 is a view for illustrating colors at color temperatures.

For example, if T1=3500K, T2=3550K, T3=3650K, and T4=3900K, a value of a warmer color than the standard color temperature 5500K will is output for all color temperatures, and it can be seen from the fact that the average color temperature Tave=3650K calculated in step S130 is a yellow that is towards red. FIG. 9 is a view for illustrating colors at color temperatures. Here, if the average color temperature Tave=3650K is a correct value as the actual ambient light, after WB correction, it closely matches the WB condition at a time of the standard color temperature 5500K as intended. However, if the detected average color temperature Tave=3650K is a value shifted to be redder than the actual ambient light, there is an overcorrection when WB correction is performed, which results in a WB condition shifted to a blue which is a cold color. At this time, when a WB corrected image becomes of cold colors even though the actual ambient light is of warm colors, a problem occurs in that as a characteristic of visual perception in humans, an error in the correction is recognized as large. Accordingly, so not to cause this kind of overcorrection in a WB correction to be occur, it is possible set a shifted value of a warm color side, which is the actual ambient light which is close to the WB condition for the time of the standard color temperature 5500K, by performing WB correction after selecting a color temperature close to the standard color temperature 5500K if the color temperature difference is large. For the above reason, even if a shift amount of the WB condition of a time of the standard color temperature 5500K becomes large, if it is on the warm color side, which is the actual ambient light, the correction error is recognized as being smaller than a time of an overcorrection to a cold color in WB correction, and therefore in step S140 processing aims for this effect. Note that, although the effect of and reason for step S140 are explained with a case in which the detected color temperature is of a warm color, even if the detected color temperature is oppositely of a cold color that is higher than the standard color temperature 5500K, it is possible to avoid a problem due to overcorrection for the same reason.

<Step S150>

The MPU 130 sets the color temperature determined in step S130 or the color temperature selected in step S140 as the color temperature that is common (common color temperature) among the right-eye main sensing unit 100R, the left-eye main sensing unit 100L, the right sub sensing unit 110R, and the left sub sensing unit 110L.

Here, explanation is given for a reason why among all capturing units a common color temperature is set and unified WB correction is performed. As previously explained, a reason that the color temperature of a plurality of capturing units differs is that in the case of a detection error due to detection of ambient light that differs in accordance with an arrangement of the capturing unit, due to individual differences of the image sensors, or the like, if a common color temperature is not used, and color temperatures detected by each capturing unit are subject to WB correction, a problem occurs in that the sensed images of the respective capturing units will have different color. In particular, a problem occurs when, in a case of WB detection at a timing chosen by a user, called one-push rather than WB control, called AWB, in which WB is automatically detected in short fixed intervals, a user wearing the head-mounted display 200 moves from an area where WB detection was performed, the color differs between capturing units, causing the user to have a significant sense of unnaturalness. For reasons such as the above, it is necessary to use a common color temperature among all capturing units to perform unified WB correction. In addition, a reason that a color temperature is used for unified WB correction among all capturing units is to handle a case in which a luminance value characteristic is very different between capturing units, such as where types of image sensors are different. In other words, by respectively applying reverse characteristics to calculate a color temperature of ambient light from luminance values for which characteristics differ for each capturing unit in wave-detection of ambient light, this color temperature becomes an indicator that can be commonly used between the capturing units.

<Step S161>

Figure 7B:
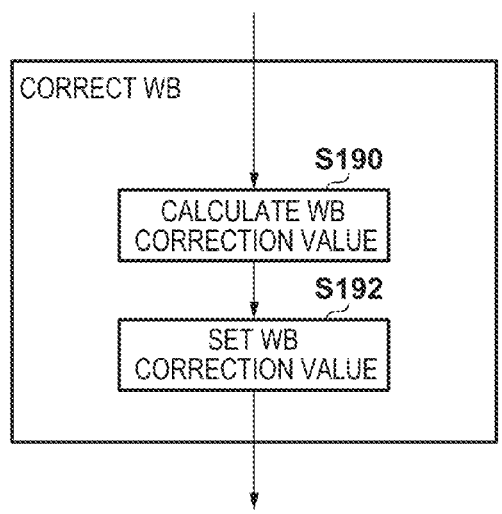

By performing processing in accordance with the flowchart of FIG. 7B, the MPU 130 uses the common color temperature to obtain a WB correction value to be used in WB correction towards an image sensed by the right-eye main sensing unit 100R, and sends the obtained WB correction value to the right-eye main sensing unit 100R.

<Step S162>

By performing processing in accordance with the flowchart of FIG. 7B, the MPU 130 uses the common color temperature to obtain a WB correction value to be used in WB correction towards an image sensed by the left-eye main sensing unit 100L, and sends the obtained WB correction value to the left-eye main sensing unit 100L.

<Step S163>

By performing processing in accordance with the flowchart of FIG. 7B, the MPU 130 uses the common color temperature to obtain a WB correction value to be used in WB correction on an image sensed by the right sub sensing unit 110R, and sends the obtained WB correction value to the right sub sensing unit 110R.

<Step S164>

By performing processing in accordance with the flowchart of FIG. 7B, the MPU 130 uses the common color temperature to obtain a WB correction value to be used in WB correction on an image sensed by the left sub sensing unit 110L, and sends the obtained WB correction value to the left sub sensing unit 110L.

Below, explanation is given for a case in which processing in accordance with the flowchart of FIG. 7B is executed in step S161. In such a case, the MPU 130 obtains a WB correction value for the right-eye main sensing unit 100R, and sends it to the right-eye main sensing unit 100R. Additionally, when executing processing in accordance with the flowchart of FIG. 7B in step S162, the MPU 130 obtains a WB correction value for the left-eye main sensing unit 100L and sends it to the left-eye main sensing unit 100L. Additionally, when executing processing in accordance with the flowchart of FIG. 7B in step S163, the MPU 130 obtains a WB correction value for the right sub sensing unit 110R and sends it to the right sub sensing unit 110R. Additionally, when executing processing in accordance with the flowchart of FIG. 7B in step S164, the MPU 130 obtains a WB correction value for the left sub sensing unit 110L and sends it to the left sub sensing unit 110L.

<Step S190>

Figure 10A:
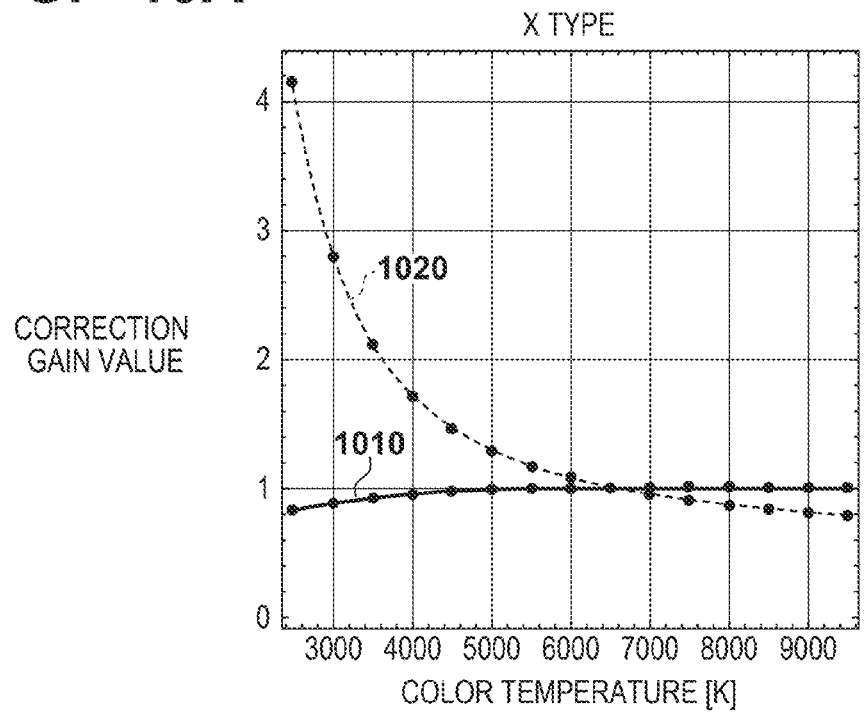
FIGS. 10A and 10B are views for illustrating example configurations of a table referred to in step S190.
Figure 10B:
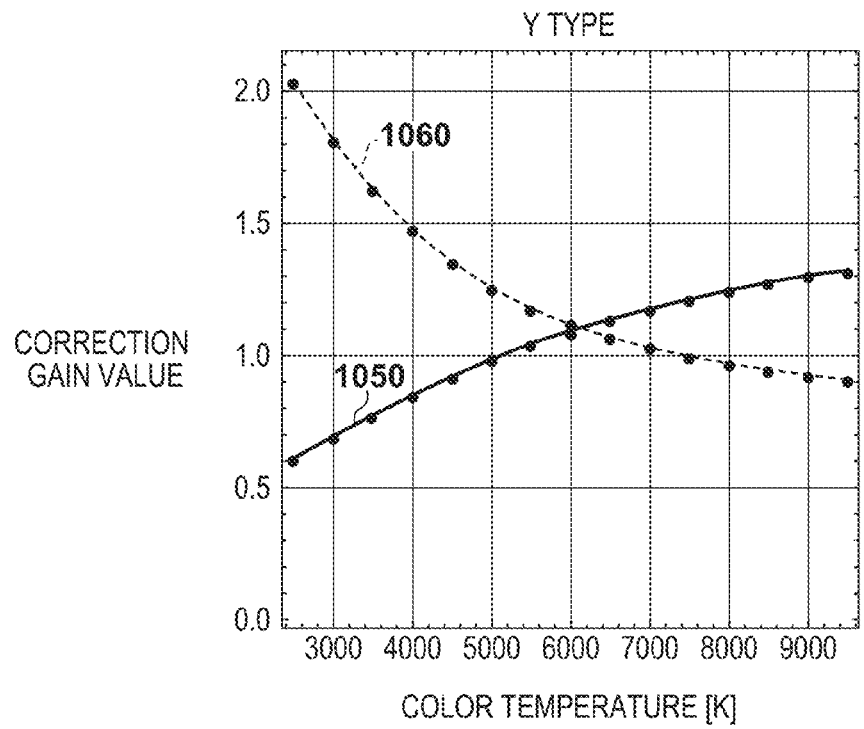

The MPU 130 obtains the R WB correction value, the G WB correction value, and the B WB correction value from the common color temperature. At that time, the MPU 130 refers to a table exemplified in FIGS. 10A and 10B. In FIGS. 10A and 10B, the abscissa axis indicates color temperature, and the ordinate axis indicates a correction gain value (WB correction value). The table of FIG. 10A is a table corresponding to the image sensors (X type) used in the main cameras, and the table of FIG. 10B is a table corresponding to the image sensors (Y type) used in the sub-cameras. Here when executing processing in accordance with of the flowchart of FIG. 7B in step S161 and step S162, the table of FIG. 10A is referred to, and when executing processing in accordance with the flowchart of FIG. 7B in step S163 and step S164, the table of FIG. 10B is referred to.

In FIGS. 10A and 10B, RGB correction gain values are, with G as a standard, R/G (reference numerals 1010 and 1050) and B/G (reference numerals 1020 and 1060), which correspond to the abscissa axis color temperature. However, for example if a color temperature T=3650K, the correction gain value in the image sensor (X type) becomes (R, G, B)=(0.9252, 1.0, 1.9633) by the table of FIG. 10A, and the correction gain value in the image sensor (Y type) is calculated as (R, G, B)=(0.7857, 1.0, 1.5678) by the table of FIG. 10B.

In this way, the tables of FIG. 10A or FIG. 10B are referred to, R/G and B/G which correspond to the common color temperature are specified, and R and B values for when G=1.0 are specified. The values of R, G, and B thus specified in this way respectively become the R WB correction value, the G WB correction value, and the B WB correction value.

<Step S192>

The MPU 130 sends the R WB correction value, the G WB correction value, and the B WB correction value obtained in step S190 to the WB correction unit 502 which the image processing unit 113 in the right-eye main sensing unit 100R has. With this, the WB correction unit 502 receives the R WB correction value, the G WB correction value, and the B WB correction value received from the MPU 130, and by performing processing such as gain correction in accordance with these WB correction values with respect to the sensed image generated by the color interpolation unit 501, achromatic color balance is adjusted, and with this WB correction on the sensed image is realized.

In this way, by WB control processing according to the present embodiment, it is possible to perform unified WB correction on sensed images of each of the main cameras and the sub-cameras.

Note that, in the present embodiment, although average pixel values of each of R, G, and B are obtained and sent to the MPU 130 in step S180, in step S181, the B average pixel value and the R average pixel value are used to perform processing, and because the G average pixel value is not used, configuration may be taken to not obtain the G average pixel value.

In the present embodiment, although explanation was given for a case in which the color components of an image are an R component, a G component, and a B component, other color components may be used, and for example, the present embodiment can be similarly applied to color components in a Lab color space as targets.

In addition, in the present embodiment, although configuration was taken to perform WB correction on each sensed image of the main cameras and the sub-cameras, configuration may be taken to perform WB correction for an image provided to an eye of a user—in other words an image sensed by a main camera, and not perform WB correction for an image not provided to an eye of a user—in other words an image sensed by a sub-camera.

<First Variation>

Figure 11:
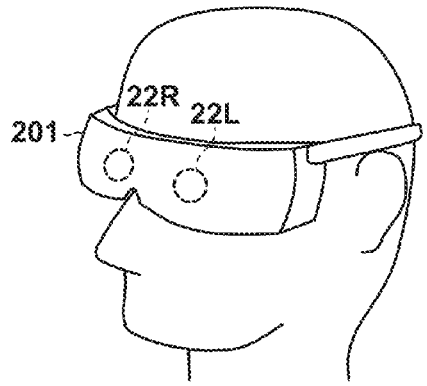
FIG. 11 is a view for illustrating an example configuration of the head-mounted display 200 according to a first variation of the first embodiment.

In the first embodiment, the head-mounted display 200 has a total of three or more cameras: two main cameras (a camera for a right eye and a camera for a left eye) for sensing a field-of-view region of a user who wears the head-mounted display 200 on their head, and one or more sub-cameras that sense an image used for detecting the a position and orientation. However, as illustrated in FIG. 11, configuration may be taken to have two cameras: a camera 22R that serves both the purpose of the right-eye main sensing unit 100R and the purpose of the right sub sensing unit 110R, and a camera 22L that serves both the purpose of the left-eye main sensing unit 100L and the purpose of the left sub sensing unit 110L.

In such a case, an image sensed by the camera 22R is used as an image that is composed with an image of a virtual space when generating an image of a mixed reality space presented to a right eye of a user that wears the head-mounted display 200, and is also used for detecting a position and orientation of the camera 22R. Also, an image sensed by the camera 22L is used as an image that is composed with an image of a virtual space when generating an image of a mixed reality space presented to a left eye of a user that wears the head-mounted display 200, and is also used for detecting a position and orientation of the camera 22L.

In the case of this kind of the head-mounted display 200, it is possible to acquire, by processing similar to the above-described processing, a common color temperature by the camera 22R and the camera 22L, obtain, from the acquired common color temperature, a WB correction value for the camera 22R and a WB correction value for the camera 22L, use the WB correction value for the camera 22R to perform WB correction on the image sensed by the camera 22R, and also use the WB correction value for the camera 22L to perform WB correction on the image sensed by the camera 22L.

<Second Variation>

In the first embodiment, the head-mounted display 200, as something having a total of 4 cameras: 2 main cameras (the camera for a right eye and the camera for a left eye) for sensing a field-of-view region of a user who wears the head-mounted display 200 on their head, and 2 sub-cameras (the right sub-camera and the left sub-camera) that sense an image used for detecting the a position and orientation, calculates a color temperature in a configuration in which differing image sensor types are mixed such as an averaging calculation. However, configuration may be taken to calculate common color temperatures dividing by image sensors in combinations of the same type, and to use the calculated common color temperatures divided for each type to perform common WB correction for each type of camera. In other words, WB correction control of the present embodiment may be performed between a plurality of cameras having image sensors of the same type, and independently for each type of image sensor.

<Third Variation>

In the first embodiment, if the color temperature difference ΔT is within the allowable range ΔTerror, the processing proceeds to step S130, and if the color temperature difference ΔT is not within the allowable range ΔTerror, the processing proceeds to step S140. However, configuration may be such that if the color temperature difference ΔT is within the allowable range ΔTerror, the processing proceeds to step S140, and if the color temperature difference ΔT is not within the allowable range ΔTerror, the processing proceeds to step S130. With such a configuration, it is effective in a case such as where the error in WB correction becomes small.

<Fourth Variation>

In the first embodiment, in step S140 a color temperature, among of T1, T2, T3, and T4, that is closest to the standard color temperature is selected as a common color temperature among the right-eye main sensing unit 100R, the left-eye main sensing unit 100L, the right sub sensing unit 110R, and the left sub sensing unit 110L. However, in step S140, because it is good if a preferred color temperature can be selected, various methods can be considered for a method that decides a common color temperature in accordance with each capturing unit.

For example, among T1, T2, T3, and T4, a color temperature closest to a median value thereof may be selected. In other words, configuration may be taken to select one based on a statistic obtained from T1, T2, T3, and T4. In addition, configuration may be taken to select a color temperature to be a predetermined value for the head-mounted display 200.

<Fifth Variation>

In the first embodiment, in step S130 an average color temperature Tave of all (the entirety) of T1, T2, T3, and T4 is decided as a common color temperature among the right-eye main sensing unit 100R, the left-eye main sensing unit 100L, the right sub sensing unit 110R, and the left sub sensing unit 110L. However, instead of all of T1, T2, T3, and T4, an average color temperature of a portion thereof may be taken as Tave. For example, configuration may be taken to obtain an average value of all of T1, T2, T3, and T4, to remove the color temperature among T1, T2, T3, and T4 for which the difference with the average value is largest, and to take an average value of the remaining color temperatures as Tave.

Second Embodiment

In the first embodiment, explanation was given of as something in which the head-mounted display 200 has capturing unit groups in which image sensors are of different types, but the head-mounted display 200 may have a capturing unit group in which image sensors are of the same type. In such a configuration, a difference in color temperature detection results between capturing units due to individual differences of image sensors becomes a main problem. Thus, in the present embodiment, WB correction control for reducing WB correction error between capturing units due to individual differences of image sensors is performed.

Below, differences with the first embodiment are predominantly described, and to the extent that something is not particularly touched on below, it is similar to in the first embodiment.

Figure 12:
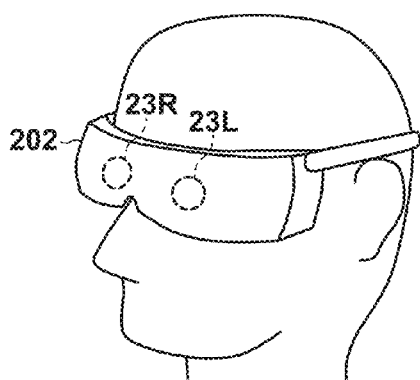
FIG. 12 is a view for illustrating an example configuration of the head-mounted display 200 according to a second embodiment.

The head-mounted display 200 according to the present embodiment, as illustrated in FIG. 12, has two cameras: a camera 23R that serves both the purpose of the right-eye main sensing unit 100R and the purpose of the right sub sensing unit 110R, and a camera 23L that serves both the purpose of the left-eye main sensing unit 100L and the purpose of the left sub sensing unit 110L, and in addition an image sensor is the same type for both cameras (Y type).

Figure 13:
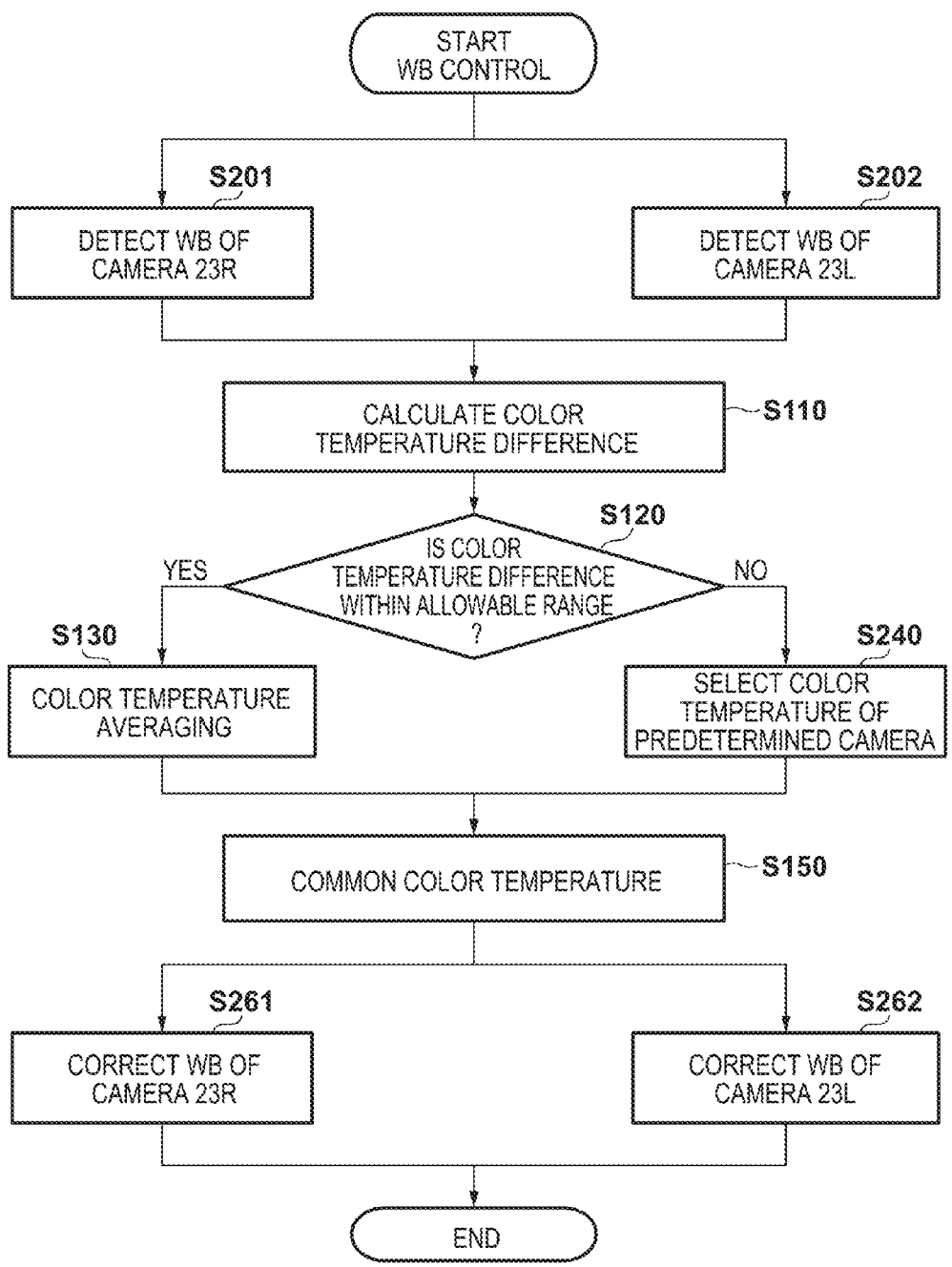
FIG. 13 is a flowchart of processing that the head-mounted display 200 performs.

In this kind of the head-mounted display 200, instead of processing in accordance with the flowchart of FIG. 1, processing in accordance with a flowchart of FIG. 13 is performed. Processing steps in FIG. 13 that are the same as processing steps illustrated in FIG. 1 have the same step number added thereto, and explanation corresponding to such processing steps is omitted or simplified.

<Step S201>
By performing processing in accordance with the flowchart of FIG. 7A, the camera 23R and the MPU 130 acquire the color temperature T1 in an entire image sensed by the camera 23R or a partial region thereof.

<Step S202>
By performing processing in accordance with the flowchart of FIG. 7A, the camera 23L and the MPU 130 acquire the color temperature T2 in an entire image sensed by the camera 23L or a partial region thereof.

In step S110, whereas in the first embodiment four color temperatures (T1, T2, T3, and T4) were made to be targets, in the present embodiment, because there are only two: T1 and T2, $\Delta T$ is simply obtained by calculating $\Delta T = |T2 - T1|$. For example, if the color temperature T1 of the camera 23R=3600K and the color temperature T2 of the camera 23L=3950K, then the color temperature difference $\Delta T$ is 350K. In this way, a cause of a difference in color temperature between the left and right cameras being generated is individual differences in the cameras due to capability variation of the image sensors, an alignment between an image sensor and a camera lens (mechanical tolerance), or the like.

In step S120, if the color temperature difference $\Delta T$ is within the allowable range $\Delta T$error, similarly to the first embodiment the processing proceeds to step S130, but if the color temperature difference $\Delta T$ is not within the allowable range $\Delta T$error, the processing proceeds to step S240.

<Step S240>
The MPU 130 selects the color temperature acquired for one camera that is predetermined as a priority camera for which detection precision of the color temperature is considered to be higher among the camera 23R and the camera 23L.

Figure 14A:
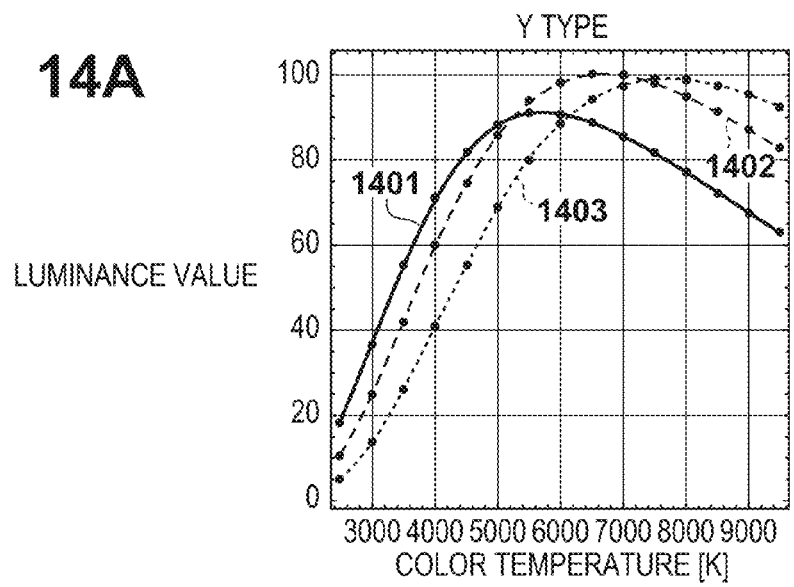
FIGS. 14A and 14B are views for explaining a method that decides a phenomenon in which detection precision of a color temperature varies, and a priority camera.
Figure 14B:
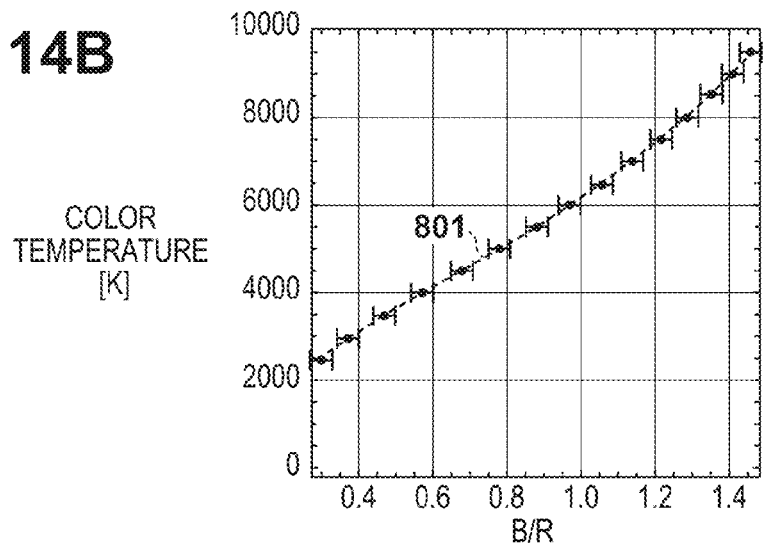

Here, FIGS. 14A and 14B are used to explain a phenomenon by which color temperature detection precision varies, and a method to decide the priority camera. FIG. 14A is a view that illustrates data created to design the color temperature detection table of an image sensor (Y type). Reference numerals 1401-1403 are curves that respectively illustrate fluctuation of the R average pixel value (average luminance value), the G average pixel value, and the B average pixel value obtained in WB wave-detection (processing in step S180) by an individual camera that has an image sensor (Y type) when the color temperature of ambient light is caused to change from 2500 through to 9500K. Here, when another camera equipped with a Y type image sensor is used to create similar data, characteristics do not bend up completely identical to FIG. 14A, and will be slightly shifted. This is an individual variability of the camera.

FIG. 14B illustrates the color temperature detection table 801, where the WB ratio is made to be the abscissa axis, and the color temperature is made to be the ordinate axis, and is created from data of FIG. 14A that is created for each of a plurality of cameras (for each of which the equipped image sensor is the Y type) to consider individual variability of a camera. For example, if the R and B average pixel values for all the cameras are calculated from the R and B average pixel values of each camera, and the WB ratio (the B average pixel value for all the cameras/the R average pixel value for all the cameras) is calculated for each color temperature, it is possible to create the color temperature detection table 801. Of course, for a method of creating the color temperature detection table 801, a method other than this can be considered. Error bars in the figure illustrate ranges of minimum and maximum variation of WB ratios of the measured data.

In the present embodiment, when acquiring the color temperature for each of the cameras 23R and 23L, the color temperature detection table 801 is used. At this point, because the WB ratio varies in the range of the error bars for the cameras 23R and 23L, the difference in color temperatures acquired for the respective cameras is at its worst in a case of a camera combination having variation in which the color temperature is the maximum for the camera 23R and the minimum for the camera 23L, for example. Note that, performing measurements for all numbers at a time of camera assembly and setting a color temperature detection table that is correctly adjusted for each individual may be considered, but because measurement allocating color temperatures takes many man-hours, measurement for all numbers at the time of assembly is not realistic as a method to fundamentally resolve this problem. However, measuring with only a specific color temperature of ambient light at a time of camera assembly, for example, under a single condition for the standard color temperature 5500K, is realistic. Accordingly, it is possible to estimate to a certain extent what amount in a +/− direction the measure assembled camera is shifted from the color temperature detection table 801 which is representative.

Figure 15:
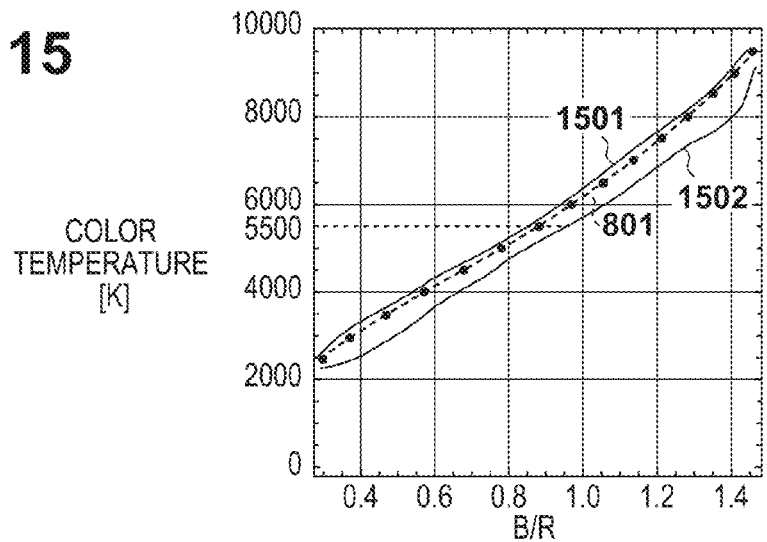
FIG. 15 overlaps color temperature detection tables 1501 and 1502 on FIG. 14B.

FIG. 15 overlaps on FIG. 14B, an accurate color temperature detection table 1501 of the camera 23R for which the entire range of color temperatures is allocated, and an accurate color temperature detection table 1502 of the camera 23L for which the entire range of color temperatures is allocated. As described above, although generating the color temperature detection tables 1501 and 1502 allocating across the entire range of color temperatures is a serious effort, obtaining the WB ratio at the standard color temperature 5500K of the present example is not as cumbersome in comparison to generating the color temperature detection tables 1501 and 1502 allocating color temperatures across the entire range. Accordingly, if the standard color temperature is 5500K, the WB ratio for each of the cameras 23R and 23L at the color temperature=5500K is obtained, and a camera for which a WB ratio closest to the WB ratio corresponding to 5500K in the color temperature detection table 801 is obtained is decided as the aforementioned priority camera. In the case of FIG. 15, because the WB ratio corresponding to 5500K in the color temperature detection table 1501 is closer to the WB ratio corresponding to 5500K in the color temperature detection table 801 than the WB ratio corresponding to 5500K in the color temperature detection table 1502, the camera 23R is decided as the aforementioned priority camera.

Note that the step to decide the priority camera from the cameras 23R and 23L explained above is performed before shipment of the head-mounted display 200, and information indicating the decided priority camera is registered in the memory 131 in the head-mounted display 200.

In addition, the above explanation was made in the case where the standard color temperature is 5500K, and if the color temperature used as the standard color temperature changes, the target decided as the priority camera can change. However, considering the use environment of the head-mounted display 200, if it is decided in advance what color temperature to set as the standard color temperature, it is possible to decide a camera that is desirable according to that to be the priority camera.

In addition, instead of simply setting the camera that is closest to the WB ratio in the color temperature detection table 801 as the priority camera for the standard color temperature, configuration may be taken to decide, as the priority camera, a camera that is closest to the WB ratio of the color temperature detection table 801 on average in color temperatures in a neighborhood of the standard color temperature or thereabove. In other words, if a color temperature in the use environment of the head-mounted display 200 is envisioned, if it is possible to decide, as the priority camera, a camera for which a WB ratio that is desirable at the envisaged color temperature (in the above example, closer to the color temperature detection table 801) can be obtained, various methods can be considered as the method to decide that.

With this, even with a camera for which a shift from the color temperature detection table 801 which is representative is large, by combining it with a better camera to assemble the head-mounted display 200, it is possible to achieve WB control that is comparatively stable.

In step S150, the MPU 130 sets the color temperature decided in step S130 or the color temperature selected in step S240 as the color temperature that is common (common color temperature) between the cameras 23R and 23L.

<Step S261>
The MPU 130, by performing processing in accordance with the flowchart of FIG. 7B, uses the common color temperature to obtain a WB correction value to be used in WB correction on an image sensed by the camera 23R, and sends the obtained WB correction value to the camera 23R.

<Step S262>
The MPU 130, by performing processing in accordance with the flowchart of FIG. 7B, uses the common color temperature to obtain a WB correction value to be used in WB correction on an image sensed by the camera 23L, and sends the obtained WB correction value to the camera 23L.

Thus, by virtue of the present embodiment, WB control for reducing WB correction error between cameras due to individual differences of image sensors becomes possible.

<First Variation>
Although, in the second embodiment, the head-mounted display 200 has image sensors of a type that is the same, if the head-mounted display 200 has image sensors of a type that is the same and has image sensors of different types, the first and second embodiments may be used in combination, such as by using WB control of the second embodiment between cameras having image sensors of the same type and using WB control of the first embodiment between cameras having image sensors of different types.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-040687, filed Mar. 2, 2015 and 2015-250498, filed Dec. 22, 2015, which are hereby incorporated by reference herein in their entirety.

What is claimed is:
1. An image processing apparatus comprising:
a processor; and
a memory storing instructions which, when executed by the processor, cause the image processing apparatus to:

acquire a color temperature of each of a first sensed image that is sensed by a first image sensing device and a second sensed image that is sensed by a second image sensing device different from the first image sensing device;

select a way to decide a common color temperature that is common to the first image sensing device and the second image sensing device based on a difference between the color temperatures acquired from the first and the second image sensing devices;

decide the common color temperature in accordance with the selected way; and adjust color information of at least one of the first and the second image sensing devices so that the first and the second image sensing devices use the common color temperature.

2. The image processing apparatus according to claim 1, wherein the adjustment of color information includes adjusting each of R, G, and B signals in an image sensed by the first image sensing device and an image sensed by the second image sensing device based on the common color temperature decided.

3. The image processing apparatus according to claim 1, wherein the selected way includes a way to decide the common color temperature based on a statistic of the color temperatures acquired.

4. The image processing apparatus according to claim 1, wherein the selected way includes a way to decide the common color temperature based on a maximum or a minimum of the color temperatures acquired.

5. The image processing apparatus according to claim 1, wherein the instructions, when executed by the processor, further cause the image processing apparatus to obtain a difference between a maximum color temperature and a minimum color temperature among the color temperatures acquired for each of the first sensed image and the second sensed image, and wherein the selection of the way to decide the common color temperature is based on whether the difference is in an allowable range.

6. The image processing apparatus according to claim 5, wherein the selection of the way to decide the common color temperature differs in a case where the difference is in the allowable range to in a case where the difference is not in the allowable range.

7. The image processing apparatus according to claim 6, wherein if the difference is in the allowable range, the common color temperature is decided to be an average color temperature of all or a portion of the color temperatures for each of the first sensed image and the second sensed image, and if the difference is not in the allowable range, the common color temperature is decided to be a color temperature that is closest to a color temperature set in advance as a standard color temperature among all or a portion of the color temperatures for each of the first sensed image and the second sensed image.

8. The image processing apparatus according to claim 6, wherein if the difference is in the allowable range, the common color temperature is decided to be an average color temperature of all or a portion of the color temperatures acquired for each of the first sensed image and the second sensed image, and if the difference is not in the allowable range, the common color temperature is decided to be one color temperature obtained from the color temperatures acquired for each of the first sensed image and the second sensed image.

9. The image processing apparatus according to claim 8, wherein the one color temperature obtained from the color temperatures acquired for each of the first sensed image and the second sensed image is a color temperature determined based on a statistic of the color temperatures acquired for each of the first sensed image and the second sensed image.

10. The image processing apparatus according to claim 7, wherein an average color temperature of a portion of the color temperatures acquired for each of the first sensed image and the second sensed image is an average color temperature of color temperatures remaining after removing, from the color temperatures acquired for each of the first sensed image and the second sensed image, a color temperature for which a difference from an average color temperature of the color temperatures is largest.

11. The image processing apparatus according to claim 1, wherein the acquisition of the color temperature of each of the first sensed image and the second sensed image includes:
obtaining an average pixel value for each color component of the respective sensed image, and
acquiring the color temperature of the respective sensed image using the average pixel values.

12. The image processing apparatus according to claim 11, wherein the acquisition of the color temperature of each of the first sensed image and the second sensed image includes:
obtaining the average pixel value of an R component and an average pixel value of a B component of the respective sensed image, and
acquiring a color temperature that corresponds to (the average pixel value of the B component) / (the average pixel value of the R component).

13. The image processing apparatus according to claim 1, wherein the image processing apparatus is a head-mounted display equipped with the first image sensing device, the second image sensing device, and a display apparatus.

14. The image processing apparatus according to claim 1, wherein the instructions, when executed by the processor, further cause the image processing apparatus to:
derive a position and orientation of the first image sensing device, and
compose a virtual object, which is generated based on the derived position and orientation of the first image sensing device, with the first sensed image.

15. The image processing apparatus according to claim 14, wherein the derivation of the position and orientation of the first image sensing device is based on the second sensed image.

16. The image processing apparatus according to claim 1, wherein a type of a sensor of the first image sensing device differs from a type of a sensor of the second image sensing device.

17. The image processing apparatus according to claim 16, wherein the sensor of the first image sensing device is of a rolling shutter method, and the sensor of the second image sensing device is of a global shutter method.

18. An image processing method comprising:
acquiring a color temperature of each of a first sensed image that is sensed by a first image sensing device and a second sensed image that is sensed by a second image sensing device different from the first image sensing device;
selecting a way for deciding a common color temperature that is common to the first image sensing device and the second image sensing device based on a difference between the color temperatures acquired from the first and the second image sensing devices;
deciding the common color temperature in accordance with the selected way; and
adjusting color information of at least one of the first and the second image sensing devices so that the first and the second image sensing devices use the common color temperature.

19. A non-transitory computer-readable storage medium storing a computer program for causing a computer to:
acquire a color temperature of each of a first sensed image that is sensed by a first image sensing device and a second sensed image that is sensed by a second image sensing device different from the first image sensing device;
select a way to decide a common color temperature that is common to the first image sensing device and the second image sensing device based on a difference between the color temperatures acquired from the first and the second image sensing devices;
decide the common color temperature in accordance with the selected way; and
adjust color information of at least one of the first and the second image sensing devices so that the first and the second image sensing devices use the common color temperature.

20. The apparatus according to claim 3, wherein the decision of the common color temperature is based on the statistic of the color temperatures acquired, if a difference between the color temperatures acquired is less than a predetermined value.

21. The apparatus according to claim 4, wherein the decision of the common color temperature is based on the maximum or the minimum of the color temperatures acquired, if a difference between the color temperatures acquired is not less than a predetermined value.

22. The apparatus according to claim 4, wherein the decision of the common color temperature is based on a color temperature closer to a predetermined reference value among the maximum or the minimum of the color temperatures acquired by the acquisition unit.

23. An image processing apparatus comprising:
a processor; and
a memory storing instructions which, when executed by the processor, cause the image processing apparatus to:
acquire a color temperature of each of a first sensed image that is sensed by a first image sensing device and a second sensed image that is sensed by a second image sensing device different from the first image sensing device;
decide, in accordance with a difference between the acquired color temperature of the first sensed image and the acquired color temperature of the second sensed image, a common color temperature that is common to the first image sensing device and the second image sensing device based on the color temperatures acquired; and
adjust color information of at least one of the first and the second image sensing devices so that the first and the second image sensing devices use the common color temperature.

24. The image processing apparatus according to claim 23, wherein if the difference is in a predetermined range, the common color temperature is decided to be an average color temperature of the color temperatures of the first sensed image and the second sensed image.

25. The image processing apparatus according to claim 23, wherein if the difference is not in a predetermined range, the common color temperature is decided to be a color temperature that is closest to a predetermined color temperature among the color temperatures of the first sensed image and the second sensed image.

26. An image processing method comprising:
acquiring a color temperature of each of a first sensed image that is sensed by a first image sensing device and a second sensed image that is sensed by a second image sensing device different from the first image sensing device;
deciding, in accordance with a difference between the acquired color temperature of the first sensed image and the acquired color temperature of the second sensed image, a common color temperature that is common to the first image sensing device and the second image sensing device based on the color temperatures acquired; and
adjusting color information of at least one of the first and the second image sensing devices so that the first and the second image sensing devices use the common color temperature.

27. A non-transitory computer-readable storage medium storing a computer program for causing a computer to:
acquire a color temperature of each of a first sensed image that is sensed by a first image sensing device and a second sensed image that is sensed by a second image sensing device different from the first image sensing device;
decide, in accordance with a difference between the acquired color temperature of the first sensed image and the acquired color temperature of the second sensed image, a common color temperature that is common to the first image sensing device and the second image sensing device based on the color temperatures acquired; and
adjust color information of at least one of the first and the second image sensing devices so that the first and the second image sensing devices use the common color temperature.

* * * * *